United States Patent [19]

Wright et al.

[11] Patent Number: 5,051,898
[45] Date of Patent: Sep. 24, 1991

[54] METHOD FOR SPECIFYING AND CONTROLLING THE INVOCATION OF A COMPUTER PROGRAM

[75] Inventors: John H. Wright, Scotts Valley; Stephen P. Tomas, Sunnyvale, both of Calif.

[73] Assignee: EDA Systems, Inc., Santa Clara, Calif.

[21] Appl. No.: 205,981

[22] Filed: Jun. 13, 1988

[51] Int. Cl.[5] .................... G06F 15/02; G06F 15/18; G06F 15/40
[52] U.S. Cl. .................... 364/200; 364/274.3; 364/274.2; 364/274.1; 364/282.1; 364/283.3; 364/286; 364/286.1; 364/286.2; 364/286.3
[58] Field of Search ... 364/200 MS File, 900 MS File, 364/300

[56] References Cited

U.S. PATENT DOCUMENTS

| | | | |
|---|---|---|---|
| 3,969,722 | 7/1976 | Danco et al. | 364/200 |
| 4,204,253 | 5/1980 | van den Hanenberg et al. | 364/200 |
| 4,316,245 | 2/1982 | Luu et al. | 364/200 |
| 4,455,619 | 6/1984 | Masui et al. | 364/900 |
| 4,536,840 | 8/1985 | Borta | 364/300 |
| 4,656,603 | 4/1987 | Dunn | 364/900 |
| 4,742,467 | 5/1988 | Messerich et al. | 364/200 |

Primary Examiner—Thomas C. Lee
Assistant Examiner—Robert B. Harrell
Attorney, Agent, or Firm—Flehr, Hohbach, Test, Albritton & Herbert

[57] ABSTRACT

A method and related system for use with an interactive computer for invocation of a computer tool. A tool template and a tool encapsulator are provided for the tool. A tool template is a predetermined representation of processes and data employed to convey program status information to the user and to allow the user to control the program as it executes. In a specific embodiment, a tool template has a plurality of graphical constituents allowing a user to specify data and parameters, to invoke a program, to control execution of the program and to observe execution of the computer program. A tool template is to be used in connection with an encapsulator to allow a user graphical access to data through a display screen. Data is stored in an elementary unit called an object, each object being assigned a "data kind" to indicate the type of data that is contained within the object. Each object is graphically represented on a display by an icon which is determined by the object's data kind. Objects can be inserted by graphical interaction into a constituent of a tool template called a "slot". A slot represents a logical input or output of an underlying tool represented by its tool template.

11 Claims, 3 Drawing Sheets

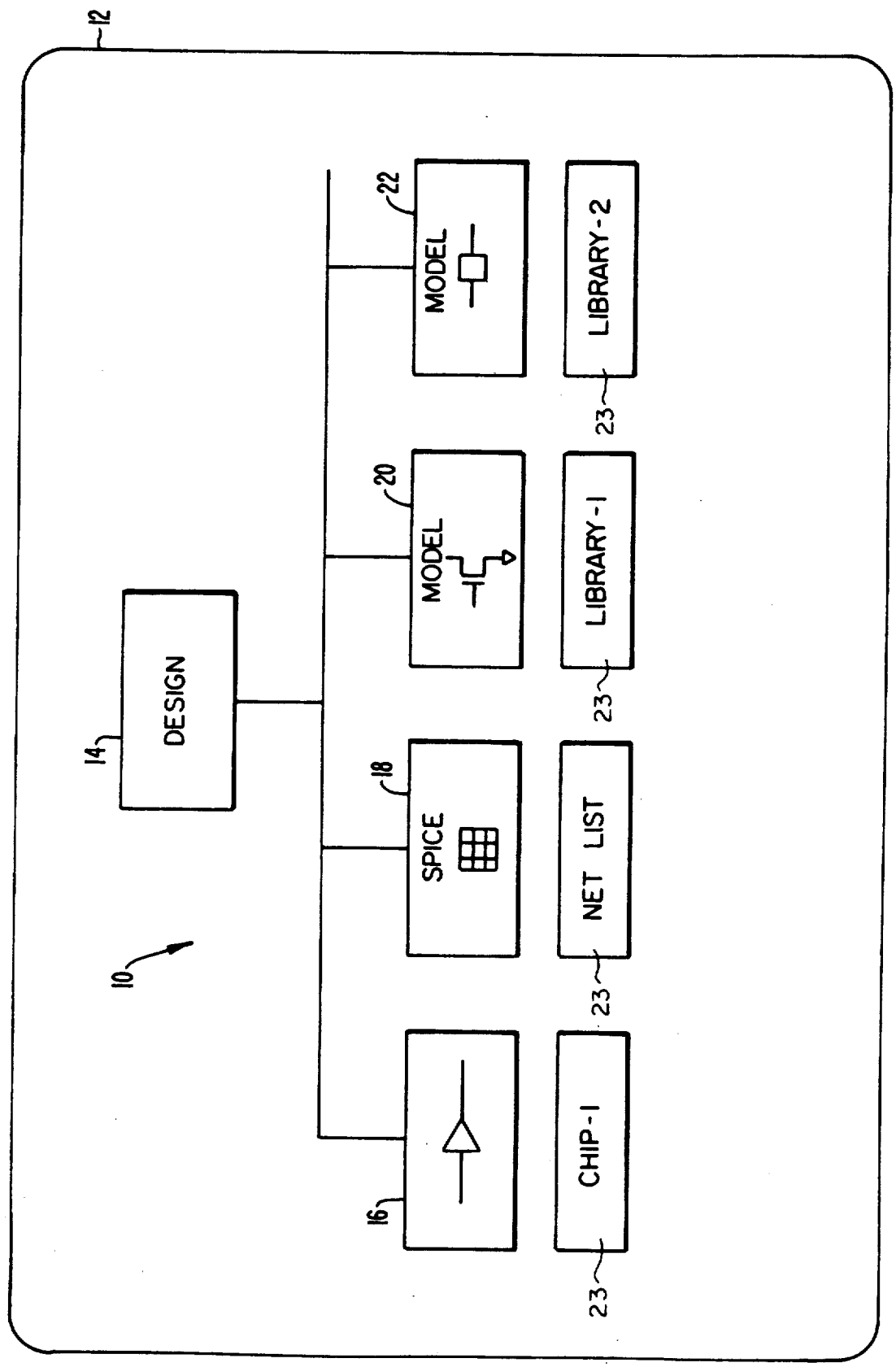
FIG._1.

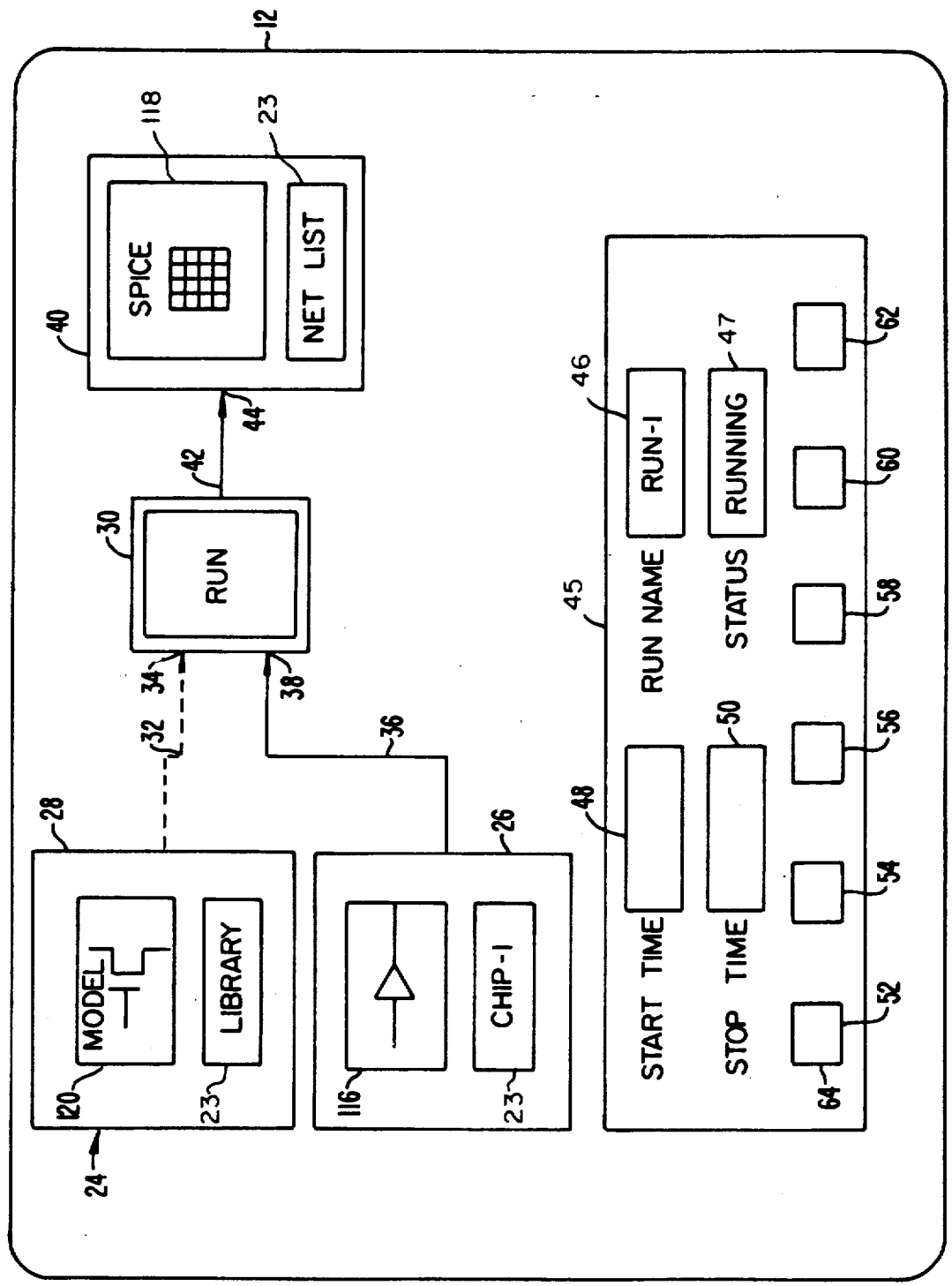
FIG._2.

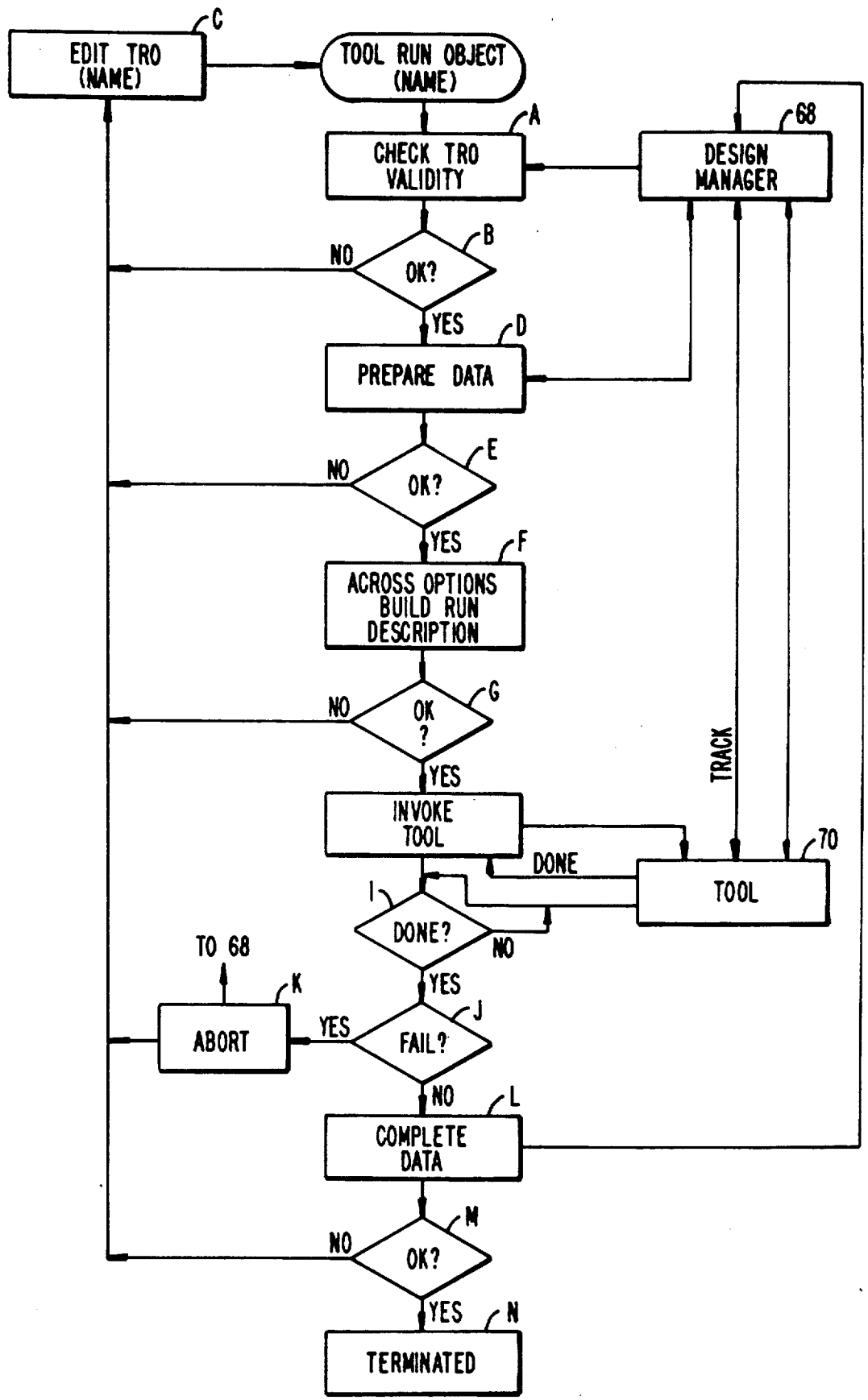
FIG._3.

METHOD FOR SPECIFYING AND CONTROLLING THE INVOCATION OF A COMPUTER PROGRAM

BACKGROUND OF THE INVENTION

1. Field of the Invention

This invention relates to a computer programs having a plurality of inputs, outputs, options and modes of operation or invocation. More specifically, the invention relates to the functions of invocation, control and monitoring of such programs in an interactive environment.

2. Description of the Prior Art

A variety of operating systems, applications programs and shells currently exist for use with computers. Because of the diversity of operating systems and programs, a user must normally become familiar with the specific functions, inputs outputs and options of each of the systems and the programs in order to use such programs proficiently. Unfortunately, in many cases, systems and programs have evolved over time to have features which are defined in a particular manner more for historical reasons than for consistency or ease of use. With the proliferation of several operating systems and local area network environments, the typical user is exposed to a great variety of operating systems and applications programs. Each such operating system and application may have its own distinct requirements. The learning of these requirements, particularly for the occasional user, can be extremely burdensome and may well dissuade a user from learning the full features of a program.

Several different common environments exist for invoking programs from a shell program or "process." As used herein and in the related arts, a "process" is the term used to identify programmed functions executable on a computer. Among the better known shells are the "windowing" environment develop by Xerox at its Palo Alto Research Center, the Apple Lisa and Apple MacIntosh environment, Microsoft Windows, QuarterDeck DeskView, IBM Presentation Manager, Digital Equipment Corporation DECOffice, the SUN/Unix shell environment and others. The invocation procedures of processes or programs under each of these shells, however, is generally limited. Most involve execution of a command line argument with the option to add, by manual typing, one or more input arguments. Whatever error checking is conducted is typically based on the error checking and correction capabilities of the program to be invoked, each of which may be unique to the program to be invoked.

What is needed is a more sophisticated mechanism for managing application programs which takes better advantage of the available interactive environment of modern computer technology, as well as for reducing the level of arcane knowledge required of a user to operate a computer with specialized computer programs.

SUMMARY OF THE INVENTION

According to the invention, a method and related system are provided for use with an interactive computer for invocation of a computer tool by employing a tool template and a tool encapsulator, where a tool is a computer program suitable for execution. A tool template is a predetermined representation of processes and data employed to convey program status information to the user and to allow the user to control the program as it executes. Specifically, a tool template has a plurality of graphical constituents allowing a user to specify data and parameters, to invoke a program, to control execution of the program and to observe execution of the computer program.

In a specific embodiment, a tool template is included in a system and is designed to be used in connection with an encapsulation program to allow a user graphical access to data through a display screen. Data is stored in an elementary unit called an object, each object being assigned a "data kind" to indicate the type of data that is contained within the object. Examples of objects are schematic diagram files and waveform files. The objects of particular interest herein are data objects and tool objects, and there are different kinds of each. Each object is graphically represented on a display by an icon which is determined by the object's data kind. Objects can be inserted by graphical interaction into a constituent of a tool template called a "slot". A slot represents a logical input or output of an underlying tool represented by its tool template.

Slots may have several parameters. Each parameter may be used to insure that the objects inserted into the slot match the characteristics of the corresponding tool input or output. For example, one parameter may indicate which data kinds are appropriate for the slot and thereby can be used for preventing insertion of objects with inappropriate data kinds. In one implementation of this invention, such a parameter is displayed as an icon that matches one or more of the objects appropriate for the slot. Thus, an icon serves to indicate to a user the kinds of objects that can be inserted into the slot.

Still further, the tool template contains a constituent called a "run button", which is also represented by an icon. The run button is a graphical device that can be used to invoke the tool corresponding to the tool template. The tool template is presented to appear to use the data filled into the tool template slots to run a tool when the run button is activated. The run button may also be used to invoke the tool by positioning of a user-controlled pointing device to place an indicator on the viewing screen over the run button, followed by invocation of a signal (a "click") on the pointing device. The visual appearance of the button may change to indicate a successful or unsuccessful invocation or completion of the tool.

According to a specific embodiment of the invention, a tool template as it appears on a viewing screen or display may have a run button placed at its geometric center, and graphical positions of slots may be provided on graphical representation of the tool template to indicate the role of slots in the invocation of the underlying tool. Solid or dashed lines between run buttons and slots may indicate relationships between objects and slots needed for successful invocation of the tool. Arranged in such a manner, the slots and run button form a process diagram on a display which guides the user in a proper invocation of the tool and which reminds the user of the rule of the datum.

A tool template may also contain one or more constituents called "options". Options may allow a user to specify logical parameters for use in invocation of a tool. Logical parameters include Boolean, integer and string values. Option values may be specified when a user interacts with the graphical representation of the option within the tool template.

A further constituent of a tool template may be a status area. The status area may provide an indication of status of the invocation of a tool. The status information may include a name associated with the invocation, the starting and completing time of the invocation and various steps of the invocation process, as well as error and other relevant information concerning the invocation of a tool.

A still further constituent of a tool template may be a control area. The control area may provide a user access to various other options associated with the invocation of the tool. For example, a user may activate a help button represented graphically by a suitable icon, to invoke a help message concerning the use of the tool. The help button may be context sensitive. The control area may also enable the user the save the tool template for future use, to record actions performed using the tool template for recovery or for historical purposes, or even to delete a tool template.

Underlying the tool template is a tool, or computer program, related to tool services herein referred to as an encapsulation shell. The encapsulation shell provides control over the syntax, input, output and options of the tool template, guaranteeing data integrity and a suitable interaction with any other programs which may be hidden from the user. The encapsulation shell, hereinafter the encapsulator, employs as its input all parameters associated with a tool template, which tool template is created by taking into account the particular attributes of its corresponding underlying tool.

The tool template implemented in accordance with the invention therefore permits representation of the logical invocation syntax of a tool, which may have extremely complex parameters and options, including the proper selection of data forming inputs and outputs of the tool as well as the number and role of each of these inputs and outputs invocation of the tool. The invention also promotes correct specification of the tool's invocation options and parameters and ensures correct invocation of the tool independent of the specific syntax of the invocation of the specific tool within a specific operating system. This independence is maintained regardless of changes in the specific tool or operating system. Finally, the tool template provides a consistent user-interface for invocation of tools.

The invention will be better understood by reference to the following detailed description taken in connection with the accompanying drawings.

BRIEF DESCRIPTION OF THE DRAWINGS

FIG. 1 is a graphical representation of data objects according to a specific embodiment of the invention.

FIG. 2 is a graphical representation of the constituents of a tool template.

FIG. 3 is a flow chart of an encapsulator according to the invention.

DESCRIPTION OF SPECIFIC EMBODIMENTS

In order to understand the invention, it is helpful to consider the operation of the invention as seen by a user. It should first be understood that the invention relies on a concept called a workspace. A workspace is an organizational environment which contains representations of application tools and design data, which makes possible the separation of data management from the file system. A workspace is a step in shielding the user from the complexities of mixing hardware and operating systems. The workspace is in fact a data file. However, it does not contain the actual design data or application tools, but only "workspace objects" that represent the actual data or tool. The workspace also tracks all access to data and tools in a history file.

Referring to FIG. 1, there is shown a graphical representation 10 of data objects, such as the elements from a computer-aided design system, as they might be displayed on a graphics display terminal 12 to a user. A suitable system is a SUN workstation operating under a UNIX operating system and connected to a file server containing the program files and data files needed to make designs in accordance with the chosen computer-aided design system. However, any workstation employing a workspace concept may be used in connection with the invention. In FIG. 1, there are graphical representations of the data kind associated with each object. In this example, there is shown an icon of a data object for a design in progress 14, an icon for a first chip ("Chip-1") 16, an icon for a netlist 18, an icon for a first model library (Model Library 1) 20, and an icon for a second model library (Model Library 2) 22. These icons graphically represent the source and resultant data of a design project, giving the user a quick view of the environment of a particular project. The icons may each have a descriptive label 23 associated with it to facilitate the association of a particular icon with its particular data object.

FIG. 2 is a graphical representation of the constituents of a tool template 24 as it might be viewed on the same workstation display as in FIG. 1. The tool template 24 is a graphical representation of an underlying tool, which in this case has two input files and one output file. A graphic for a slot 26 is provided. A slot is a field associated with a tool object for containing as a data kind one or more workspace objects to be used as input or output when the tool is invoked. A slot describes the type of object that can be passed as an argument to the tool. There is a slot parameter which identifies the appropriate kinds of objects which can be "contained" in the slot.

As seen in FIG. 2, the user views a graphical representation of a slot as a field on a template that can contain an argument or a list of arguments. The argument or list of arguments is placed in a slot 26 as part of the graphical placement of an icon 116 in the slot 26. Slot 26 represents an input to a tool represented by the tool template 24. The icon 116 is identical to the icon 16 (FIG. 1) as viewed by the user, and may include descriptive label 23. FIG. 2 represents a state of completed action which was previously carried out by "clicking" an icon 16 and inserting it in slot 26. It indicates to the user that an object of the same kind as shown in FIG. 1 can be inserted into slot 7, and that the slot parameter indication for the appropriate object kinds for that slot includes the object kind represented by the icon 16. If an attempt were to be made to insert an object of an impermissible data kind in a slot, an error message is generated. As will be explained hereinafter, a tool called "tool services" provides encapsulation according to the invention, which makes this type of user presentation and interaction feasible. A second slot 28 is provided, and the second slot is shown containing the icon 120 for the first model library 20 of FIG. 1. Slot 28 may incorporate descriptive label 23 associated with icon 20. A run button 30 is provided at approximately the center of the display as herein seen in FIG. 2. The run button 30 is an icon representing the tools which can be invoked employing the input slots 26 and 28. When the run button 30 is clicked, the underlying tool is invoked.

A dotted line 32 with arrowhead 34 from the slot 28 to the run button 30 indicates to the user that the tool can be invoked without any objects inserted in the slot. A single solid line 36 with arrowhead 38 between the slot 26 and the run button 30 indicates to the user that the slot 26 must have a minimum of 1 object inserted in it for the tool represented by the run button 30 to be successfully invoked.

A slot 40 is provided to the right of the run button 30, and a solid line 42 with arrowhead 44 from the run button 30 to the slot 40 indicates that the slot 40 corresponds to an output of the tool represented by the tool template 24. Slot 40 may contain an icon 118, with optional descriptive label 23, representing net list 18 (FIG. 1) to direct the output of the tool to a particular workspace.

A status area 42 of the tool template 24 is preferably provided on the display. A run name field 46 is provided as a means of identification of each invocation of the tool corresponding to the tool template 24. The run name can be used later to retrieve information pertinent to the particular invocation. A status field 47 is provided to display the current step in the invocation process of the tool. As an example the status field shows that the tool is running, i.e., executing the program that implements the tool. Other status indicators may include preparation of data, completion of run, release of data following normal completion of run, and abortion of data preparation following abnormal termination of run. The status field 45 may also show start time in a start time field 48 and stop time in a stop time field 50. Additional "buttons" 52, 54, 56, 58, 60, 62 are provided within the status area 45 for such functions as cancel, show errors, reset, save, quit, or other option constituents of the tool template 24. The buttons are invoked by clicking the feature, that is, placing a cursor at the button and pressing an execute key. Feedback of action is provided by a change in the attributes or color of the button or its margin, as for example margin 64.

Reference is now made to FIG. 3, which is a flow chart of the encapsulator upon invocation of the run function. The encapsulator is the tool which is used according to the invention to "perform" or execute other tools. More specifically, it is the computer program which places a tool into an environment which can be readily and consistently controlled. Its input data is a tool run object, and it exchanges information with a design manager. A design manager is a general purpose database management program which performs such routine functions as registering data changes made by a tool, gathering data, checking data and controlling file locking or record locking. The design manager uses the workspace in order to store the design and the tool representation. When a tool has been encapsulated according to a specific embodiment of the invention, the design manager can control the input and output files of the tool. The operation of the design manager depends on the description of the tool and the data in the workspace, and the design manager performs operations as instructed by the encapsulator.

A tool run object is a logical description of a named run. It is a workspace object which stores all relevant information associated with a specific tool run, including input version objects, output version objects, option settings and file names. The design manager would typically update the tool run object with each operation.

The process of encapsulation begins with a check for validity of the tool run object based on a description of the tool (Step A). This step involves access to a design manager 68 from which the needed descriptive information is retrieved. If the description of the tool does not match (Step B), then the user is given the opportunity to edit the subject tool run object (Step C). Thereafter, the process is restarted and the validity check is repeated (Step A).

If the validity check is passed (Step B), then the data is prepared (Step D). Again, the design manager 68 is called upon to perform the task, such as copying files, renaming files, setting up file protection and updating files. The prepared data is checked (Step E), and if not okay, the user is again given an opportunity to edit the tool run description. If the data is okay, then the tool description is used to access the available options, and a suitable run invocation description is built (Step F). The options may be options visible to the user, such as command line options of the tool, or options which are information regarding how to interact with a tool, such as names of files assigned by the design manager to needed data files. The description is checked (Step G). If it is not okay, the editor is invoked (Step C) and the process restarted.

If the description is okay, then the tool 70 is invoked (Step H). In this example, the tool which is invoked by encapsulation is a file editor. The tool 70 performs its task, interacting directly with data or with the design manager 68. The design manager 68 tracks the operation of the tool 70 so long as it is active. When it has been determined the tool has finished its run (Step I), it must be determined whether the tool has terminated normally or in a failure mode (Step J). If the tool 70 has aborted due to failure, then the design manager 68 is so informed (Step K) so that any uncompleted file management processes can be aborted and correct data can be restored. The editor for the tool run object is reactivated (Step C), and the process is restarted.

If the run has been completed normally, then the next step is to complete the data (Step L). This is a step employing the design manager 68. For example, the design manager 68 might register a newly-processed data file as an updated version. The completed data is then checked (Step M) and if not okay, the editor is invoked (Step C) and the process is restarted. If the completed data is okay, the process is terminated (Step N).

As will be noted, encapsulation is interactive. At each stage, there is management of the tool so that the user experiences only a consistent user interface. The editor for the tool run object is an important element of the process.

Appendix A is a source code listing of one embodiment of the encapsulation tool. The encapsulation tool invokes an editor, which in the specific embodiment is called EVE, through which the desired tool can be invoked and all relevant data can be modified. The encapsulation tool also calls other utility tools to perform certain tasks which have general application. The utility tools are commonly available or can be prepared by a programmer of ordinary skill in the art without undue experimentation. The utility tools as a group may comprise the data manager, as referred to above. Therefore, it is unnecessary to provide a detailed description of each of the utility tools used in connection with the invention. A brief description of the code of the encapsulator follows.

The first step is to "push" the "context" into the "current project". This is the process of changing default settings within the design manager, so that the context of all commands and processes are consistent. Thus the problems of duplicate file names and other such concerns are minimized. Thereafter, the identification label of the tool run object is checked for validity, and then a check is made to determine if all of the inputs and outputs that need to be specified are in fact specified. This corresponds to Step A, above.

The data for tool run object is then prepared, corresponding to Step D, above, and the prepared data is checked as to form, corresponding to Step E, above, and these steps are typically performed by the design manager.

The arguments are retrieved and placed in a slot buffer file, and a list of all arguments to be edited is built.

Thereafter, the text editor is invoked on the slot buffer file, which contains all the arguments which are to be edited. The tool is invoked as a part of the invocation of the editor. When the editor is exited, indicating the deactivation of the tool, the start time is compared with the modification time for each argument to determine which are the last items that have been edited and to avoid making a new and conflicting version of the arguments. The opportunity is given to restart the process if the editing of any argument is aborted.

Finally, the data is completed, and the latest and correct version of an argument is registered. At the termination of the process, the "context" is "pushed", thereby restoring the state of the operating environment of the design manager to its condition prior to activation.

The system has been described in reference to specific embodiments. Other embodiments, variations and modifications to the herein described invention will be apparent to those skilled in the art. For example, an encapsulator may itself be considered a tool to be invoked and controlled by another encapsulator. The same design manager can be used with each encapsulator for providing the desired management services. Therefore, it is not intended that this invention should be limited except as indicated by the accompanying claims.

APPENDIX A

```
        te_quit_action(tro_id, dialog_id, FALSE)
}
func eve_run(tro_id, dialog_id)
int tro_id           /* ID of template TRO. */
int dialog_id        /* ID of template dialog, or -1 if none. */
{
    ts_ty_tro_info t
    int fid, qid, i, tool_id, obj_ty, start_time
    int arg_count, arg_i
    ts_ty_arg_info arg_info
    ws_gdo_info gdo_info
    dt_sel_list_entry sel_entry
    int status
    string s
    sy_ty_dir_stat statstruct
"*******************************************************************************"
"*              Activating EVE encapsulated editor.                            *"
"*******************************************************************************"

ds_push_context_byid(sc_project_id( ))
    if (tro_id == ws_null_id) {
        "INTERNAL ERROR: Null TRO id for EVE run."
        ds_pop_context( )
        return
    }
    stat = te_ts_check_tro(tro_id, dialog_id)
    if (stat != TS_ST_OK) return FALSE
    stat = te_ts_prepare_tro(tro_id, dialog_id)
    if (stat != TS_ST_OK) return FALSE
    arg_i = ts_first_argument(tro_id, "eve_inputs")
    te_util_clear_file("slot_buffer.eve")
    while (arg_i != 0) {
        arg_info = ts_get_argument(tro_id, "eve_inputs", arg_i)
        gdo_info = ws_get_gdo_info(arg_info.ws_value)
        /* The names of the objects now include the type and kind so that
         * two objects of the same kind can be edited.
         */
        s = strcat(gdo_info.name, "(", ds_get_relative_name(gdo_info.id))
        s = strcat(s, ":", gdo_info.kind)
        s = strcat(s, ") ", arg_info.fs_value)
        s = strcat(s, " n")
        te_util_write_file("slot_buffer.eve", s)
        arg_i = ts_next_argument(tro_id, "eve_inputs", arg_i)
    }
    te_util_write_file("slot_buffer.eve", "/n")
    start_time = sy_time_current( )
    sy_time_bin2asc(start_time, 0)
    "Invoking EVE, type <return> to startup."
    status = te_ts_activate_tro(tro_id, "eeve", TRUE, dialog_id)
    if (status != TS_ST_OK) {
        status = te_ts_abort_tro(tro_id, dialog_id)
        return FALSE
    }
```

APPENDIX A-continued

```
   status = te_ts_deactivate_tro(tro_id, dialog_id)
   /* Go through each item in the list looking for those that have not
    * been altered since invoking the tool.
    */
   arg_i = ts_first_argument(tro_id, "eve_inputs")
   while (arg_i != 0) {
      arg_info = ts_get_argument(tro_id, "eve_inputs", arg_i)
      /* If the file modification date is not after the invocation time,
       * then abort the argument and print a message.
       */
      /* Check if the file has been modified since the start_time..
         if not, abort the argument */
      statstruct = sy_dir_stat(arg_info.fs_value)
      if ( !(statstruct.mod_time > start_time) ){
         "Object ", ds_get_simple_name(arg_info.ws_value), " not modified."
         ts_abort_argument(tro_id, "eve_inputs", arg_i)
      }
      arg_i = ts_next_argument(tro_id, "eve_inputs", arg_i)
   }
   status = te_ts_complete_tro(tro_id, dialog_id)
   ds_pop_context( )
   return TRUE
}
proc eve_opt(tro_id, dialog_id)
int tro_id        /* ID of template TRO. */
int dialog_id     /* ID of template dialog, or -1 if none. */
{
   ....
   "Tool EVE has no options."
   ....
}
proc eve_help(tro_id, dialog_id)
int tro_id        /* ID of template TRO. */
int dialog_id     /* ID of template dialog, or -1 if none. */
{
   ....
   "Encapsulated EVE text editor."
   ....
}
proc eve_field(slot_name)
string slot_name
{
   te_field_action(slot_name)
}
```

We claim:

1. A system for controlling an invocation of a plurality of tools on an interactive digital computer system, each of the plurality of tools comprising a computer program having a plurality of options, including input parameters, output parameters, and modes of operation, said system comprising:
a tool template, defined in the interactive computer system, for each of the plurality of tools, each said tool template including a description of information relevant to invocation of a particular one of said plurality of tools, including input data format, output data format, command line parameters and execution options to allow a user to control, by use of said interactive computer system, said particular tool as it is executed;
data base management means for managing of respective information used in the course of invoking and executing each of said respective tools; and
computer means interactive with said data base management means and said respective tool templates for encapsulating said plurality of tools such that information regarding invoking of each respective tool can be communicated between the user and said data base management means, through a respective tool template of a respective invoked tool, to provide a consistent user interface for interactively invoking each of said plurality of tools.

2. The system according to claim 1 wherein each said tool template further includes a plurality of graphical constituents displayed as icons on a visual display of said interactive computer system, and means for apparent interaction with said icons for allowing said user to specify data and parameters, to invoke said particular tool, to control execution of said particular tool and to observe execution of said particular tool on said computer system.

3. The system of claim 1 wherein said database management means can perform selected ones of management functions including gathering data and controlling input and output of the files of encapsulated tools.

4. The system of claim 1 wherein said encapsulating means includes means to check validity of a tool run object.

5. The system of claim 1 wherein said encapsulating means includes means for building a suitable run description for an invoked tool.

6. The system according to claim 1 wherein each said tool template further includes a plurality of graphical constituents displayed as icons on a visual display of said interactive computer system, and means for apparent interaction with said icons for allowing said user to specify data and parameters, to invoke said particular tool to control execution of said particular tool and to observe execution of said particular tool on said computer system.

7. The system according to claim 6 wherein said graphical constituents include a first icon representing a run button for said particular tool, at least a second icon representing input information to said particular tool, and graphical connection means for showing a connection between said second icon and said first icon to indicate a relationship between said input information and said particular tool.

8. A method for controlling an invocation of a plurality of tools on an interactive digital computer system, each of the plurality of tools comprising a computer program having a plurality of options, including input parameters, output parameters, and modes of operation, said method comprising the steps of:

creating, on the interactive digital computer system, a tool template for each of the plurality of tools, each said tool template including a description of information relevant to invocation of a particular one of said plurality of tools, including input data format, output data format, command line parameters and execution options to allow a user to control said particular one tool by said interactive digital computer system as it is executed;

thereafter interacting with a database manager in order to prepare input data for a particular tool;

providing a user with an opportunity to edit incorrect data through interaction with a tool template corresponding to the particular tool;

building a run invocation description;

thereafter invoking said particular tool and thereby producing a run of said particular tool;

thereafter when execution of said particular tool has terminated, determining whether said particular tool has finished said run normally and has produced a data set and if said run has not finished normally, aborting any uncompleted file management processes and replacing any corrupted data of said data set with prior good data;

otherwise completing said data set and checking for integrity of said data set.

9. The method of claim 8 and further including the step of: checking for validity of a tool run object based on a description of said particular tool and if said description of said particular tool does not match said tool run object, giving said user an opportunity to edit said tool run object through interaction with a tool template corresponding to the particular tool.

10. The method according to claim 8 wherein each said tool template further includes a plurality of graphical constituents, the method further including the step of thereafter allowing a user to specify data and parameters, to invoke said particular tool, to control execution of said particular tool, and to observe execution of said particular tool on said computer system.

11. The method according to claim 8 wherein said graphical constituents include a first icon representing a run button for said particular tool and at least a second icon representing input information to said particular tool, the method further including the step of thereafter responding to a clicking of said run button to invoke said particular tool.

* * * * *